United States Patent [19]

McClure

[11] Patent Number: 5,155,860
[45] Date of Patent: Oct. 13, 1992

[54] CELLULAR PORTABLE TELEPHONE BATTERY PACK AND PROGRAMMER INTERFACE

[75] Inventor: Dana W. McClure, El Toro, Calif.

[73] Assignee: Cellular Communications Corporation, Houston, Tex.

[21] Appl. No.: 596,418

[22] Filed: Oct. 12, 1990

Related U.S. Application Data

[63] Continuation of Ser. No. 290,061, Dec. 27, 1988, abandoned.

[51] Int. Cl.⁵ .................. H04B 1/38; H04B 17/02
[52] U.S. Cl. .................................. 455/89; 455/90; 455/186.1; 379/58; 379/412
[58] Field of Search ............ 455/186, 89, 90, 347, 455/348, 349, 127, 343; 307/542, 343, 570; 361/15, 90, 111, 58; 379/412, 415, 61, 58

[56] References Cited

U.S. PATENT DOCUMENTS

| | | | |
|---|---|---|---|
| 3,668,465 | 6/1972 | Evans et al. | 361/111 |
| 3,725,674 | 4/1973 | Schaeffer et al. | 307/542 |
| 4,012,643 | 3/1977 | Miura | 307/542 |
| 4,388,500 | 6/1983 | Regan | 370/32.1 |
| 4,648,125 | 3/1987 | Brown | 455/89 |
| 4,750,078 | 6/1988 | Ganger et al. | 361/111 |
| 4,761,823 | 8/1988 | Fier | 455/90 |
| 4,771,399 | 9/1988 | Snowden et al. | 455/186 |
| 4,792,986 | 12/1988 | Garner et al. | 455/89 |
| 4,794,636 | 12/1988 | Sanglier et al. | 379/62 |
| 4,808,859 | 2/1989 | Even-or et al. | 307/542 |
| 4,829,224 | 5/1989 | Gandelman et al. | 455/90 |
| 4,876,552 | 10/1989 | Zakman | 455/89 |
| 4,903,330 | 2/1990 | Ishiguro et al. | 455/186 |
| 4,951,308 | 8/1990 | Bishop et al. | 379/91 |
| 4,965,821 | 10/1990 | Bishop et al. | 379/91 |

*Primary Examiner*—Reinhard J. Eisenzopf
*Assistant Examiner*—Lisa Charouel
*Attorney, Agent, or Firm*—Young & Thompson

[57] ABSTRACT

An apparatus that includes various connectors, a battery compartment, and a circuit card is disclosed. The apparatus serves as a battery pack and programmer interface unit (BP/PIU) which mates with a cellular portable telephone (CPT) transceiver to form a CPT assembly. The CPT assembly is specifically adapted for use in connection with an automated registration and registration cancellation system, such as that utilized in the management of rental CPTs. The battery compartment is enlarged so that rental CPT assemblies may be used for a reasonable rental period without requiring a battery recharge. Electrical circuits protect various ones of signals provided at a communications port of the CPT transceiver. Connectors are arranged to permit a CPT programmer to read and program CPT parameters without disassembling the CPT assembly.

20 Claims, 3 Drawing Sheets

CELLULAR PORTABLE TELEPHONE BATTERY PACK AND PROGRAMMER INTERFACE

This application is a continuation of application Ser. No. 07/290,061, filed Dec. 27, 1988 now abandoned.

TECHNICAL FIELD OF THE INVENTION

The present invention relates generally to cellular portable telephones ("CPTs"). More specifically, the present invention relates to a CPT which is adapted for use in connection with an automated rental system through an association with a battery pack and programmer interface unit.

BACKGROUND OF THE INVENTION

Recent years have seen a rapid growth in new telecommunication services and related products. One field of new services and products relates to cellular mobile radiotelephones ("CMRs"), which permit a large number of users to simultaneously communicate through the Public Switched Telephone Network ("PSTN") without being tied to the PSTN through electrical wiring. Thus, customers of cellular services have enjoyed the benefits of telecommunication services at times when they would otherwise be inaccessible.

CMRs incorporate a family of products which provide cellular telecommunication services. Many of these products are designed for permanent installation in an automobile or at a remote location. However, CPTs differ because they are designed to be carried by a cellular customer, much like any other portable radio. Consequently, CPTs can also provide a cellular customer with telecommunication services when the customer is not located near automobiles or such remote locations.

Of course, each of the cellular products, when coupled to the associated cellular services, requires a substantial investment. Moreover, cellular products are typically used in connection with a particular cellular system or service area with which they are registered. Consequently, many activities, which are of a temporary nature or perhaps remote to a home cellular system, do not benefit from telecommunication services because the temporary or remote nature of such activities discourages the investment required to obtain a cellular product and service.

The rental of CPTs addresses many of these problems. A CPT does not require permanent installation, and a CPT may be carried to remote locations. Thus, a rental arrangement serves temporary activity and remote location activity needs. In addition, a rental arrangement requires a much smaller investment on the part of a customer for telecommunication services. An organization wishing to rent CPTs to the public could simply purchase a number of CPTs, arrange telecommunication services for each of the purchased CPTs, and rent the CPTs using systems and procedures similar to the ones commonly used by rental organizations. However, this is an inefficient use of cellular telecommunication resources, and such a rental system requires customers to pay excessive rental fees.

On the other hand, an efficient system for the rental of CPTs requires a greater amount of complexity, organization and management when compared to the rental of other products. For example, the telecommunication services for the rental CPTs can be established or registered with an appropriate cellular system or management organization only during a rental transaction, and then unregistered or cancelled upon return of a rented CPT. This dynamic registering scheme allows efficient allocation of telecommunication services to only those CPTs which are currently being rented. In addition, the rented CPTs must be easily and quickly identifiable to insure that returned CPTs are the same ones that were rented. However, such a system, if not significantly automated, requires a large amount of management overhead, which would again force CPT rental customers to pay excessive rental fees.

During registration, CPTs are programmed to store a mobile identification number ("MID"), which represents the phone number assigned to the CPT. Additionally, the CPTs are programmed to store a system identification number ("SID") which identifies the particular cellular system with which the CPT is a subscriber. Moreover, the CPTs store, in an unalterable form, an electronic serial number ("ESN") which uniquely identifies the CPT. Conventional CPTs cannot successfully operate in connection with an automated registration and cancellation procedure because signals required to program and read such information are inaccessible from outside the conventional CPT. Consequently, a need exists for an apparatus which adapts a CPT transceiver for use in connection with an automated check-out and check-in system.

SUMMARY OF THE INVENTION

Accordingly, it is an advantage of the present invention that a battery pack and programming interface unit which adapts a CPT transceiver for use in connection with an automated check-out and check-in system is provided.

Another advantage of the present invention is that the present invention provides an interface for a CPT transceiver's communications port so that a CPT programmer can read and program CPT parameters without requiring disassembly of the CPT assembly.

Yet another advantage is that the present invention provides an improved battery pack for use with a CPT in an automated rental system.

The above and other advantages of the present invention are carried out in one form by a battery pack and programming interface unit which is characterized by unit walls. The unit walls are formed so as make a compartment for housing batteries. A circuit board which has an electrical interface circuit thereon is located between opposing sides of the unit walls. A first connector extends through the unit walls for electrically coupling the electrical interface circuit to a CPT transceiver. In addition, a second connector extends through the unit walls for electrically coupling the electrical interface circuit to a CPT programmer.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED EMBODIMENT

Figure 1:
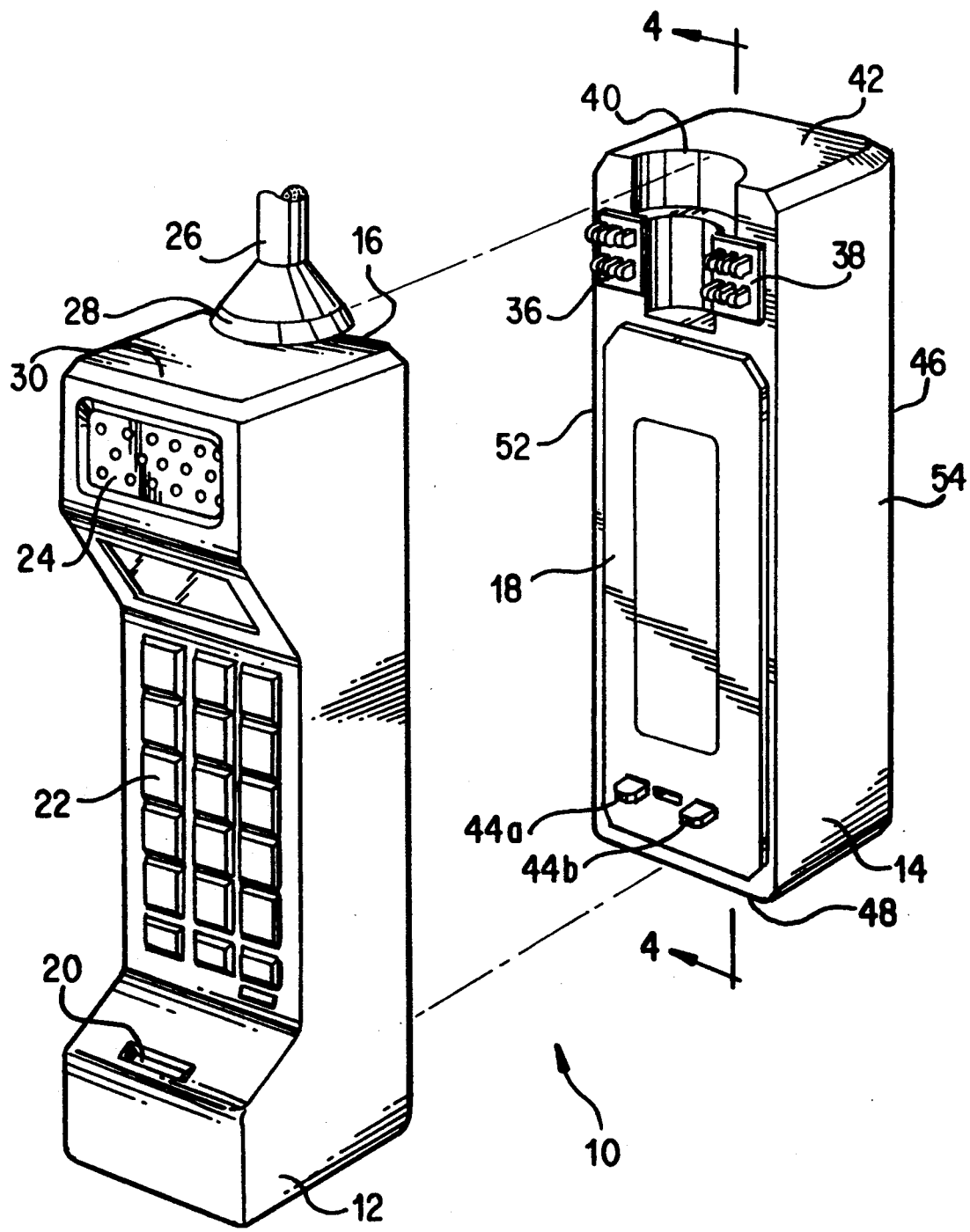
FIG. 1 shows an exploded perspective view of a CPT assembly in accordance with the present invention.

FIG. 1 shows a cellular portable telephone ("CPT") assembly 10 which includes a CPT transceiver 12 and a battery pack and programmer interface unit ("BP/PIU") 14. BP/PIU 14 mates with CPT transceiver 12 at a back surface 16 of CPT transceiver 12 and a front exterior wall 18 of BP/PIU 14.

CPT transceiver 12 represents a conventional CPT transceiver. Numerous descriptions of conventional CPT transceivers, their operation, and their constituent components are described in publications available to practitioners of the art. In particular, reference is made to a document entitled "DYNA T.A.C. (TM) Cellular Portable Telephone Instruction Manual," number 68P81071E55-B, available from Motorola, Inc., Technical Writing Services, 1301 E. Algonquin Rd., Schaumburg, Ill. 60196, which is incorporated herein by reference.

Figure 2:
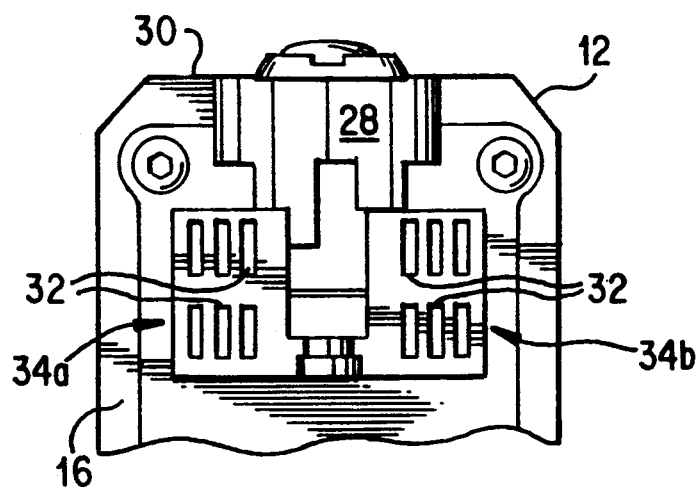
FIG. 2 shows a back plan view of a top portion of a CPT transceiver in accordance with the present invention.

Briefly, CPT transceiver 12 has a microphone 20, a keypad 22, and a speaker 24 on surfaces of CPT transceiver 12 other than the aforementioned back surface 16. In addition, CPT transceiver 12 includes an antenna 26, which couples to CPT transceiver 12 at an antenna connector 28. Antenna connector 28 resides on a top surface 30 of CPT transceiver 12 and protrudes outward from CPT transceiver 12 at back surface 16. FIG. 2 shows another view of connector 28 along with that portion of back surface 16 which resides near top surface 30.

As shown in FIG. 2, CPT transceiver 12 includes twelve socket, or female, connector pins 32, which are nestled around antenna connector 28. Socket pins 32 are arranged in a predetermined orientation wherein a first set 34a, consisting of six of the twelve socket pins 32, reside on one side of antenna connector 28, and a second set 34b, consisting of six of the twelve socket pins 32, reside on an opposing side of antenna connector 28. Together, socket pins 32 transport electrical signals utilized by a communications port of CPT transceiver 12 in a manner which is known to those skilled in the art, and which is discussed in the above-referenced "DYNA T.A.C. (TM) Cellular Portable Telephone Instruction Manual."

Figure 3:
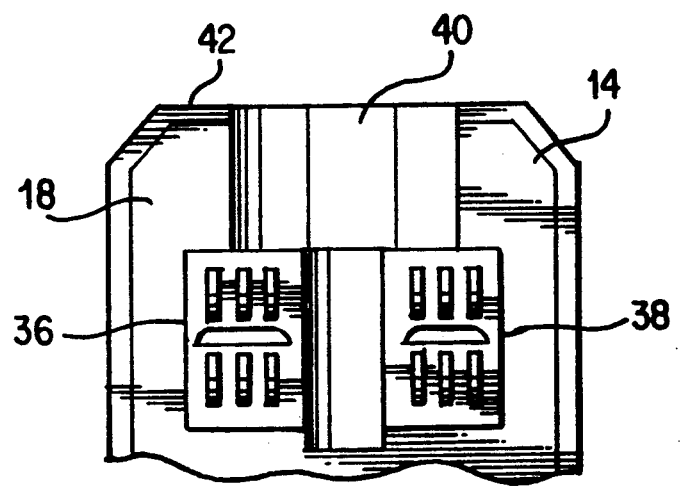
FIG. 3 shows a front view of a top portion of a battery pack and programmer interface unit ("BP/PIU") of the present invention.

Referring to FIGS. 1 and 3, BP/PIU 14 includes, at front wall 18 thereof, a connector 36 and a connector 38. Each of connectors 36 and 38 extends through front wall 18 and includes 6 plug, or male, pins oriented to mate with sets 34a and 34b, respectively, of socket pins 32 (see FIG. 2). Thus, the entire 12 pin communications port of CPT transceiver 12 is available to BP/PIU 14.

A positive power contact 44a and a negative power contact 44b additionally extend through front wall 18 and project outward therefrom. Contacts 44a–44b mate with complementary connector socket pins on CPT transceiver 12 (not shown) to electrically energize CPT transceiver 12.

With further reference to FIGS. 1, 2, and 3, BP/PIU 14 includes an antenna indention 40, which protrudes inward into BP/PIU 14 from front wall 18 thereof at a top exterior wall 42 thereof. Antenna indention 40 is shaped complimentary to antenna connector 28 of CPT transceiver 12. Consequently, the outward protrusion of antenna connector 28 from back surface 16 of CPT transceiver 12 mates with antenna indention 40 so that front wall 18 of BP/PIU 14 may contact back surface 16 of CPT transceiver 12.

Figure 4:
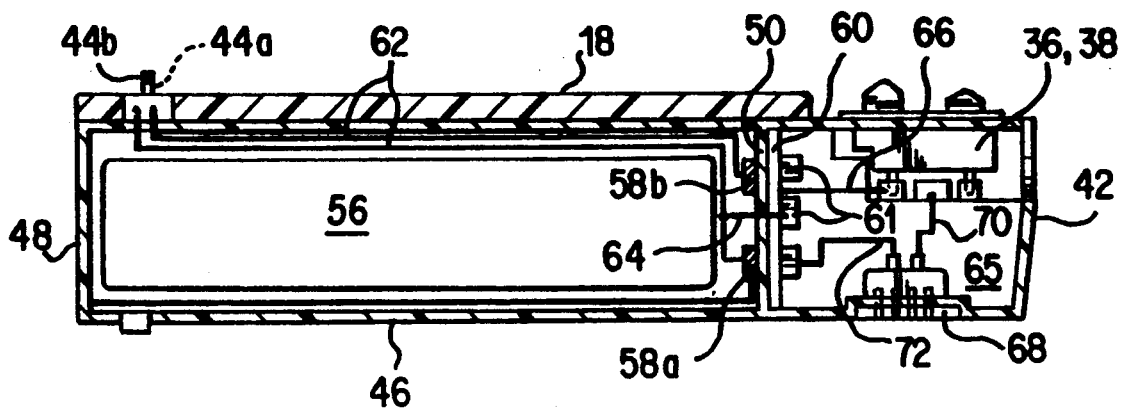
FIG. 4 shows a cross-sectional side view, taken at line 4—4 in FIG. 1, of the BP/PIU of the present invention.

As shown in FIG. 1, the shape and size of front wall 18 of BP/PIU 14 is defined by back surface 16 of CPT transceiver 12. In other words, front wall 18 has approximately the same shape and size as back surface 16. Thus, when BP/PIU 14 mates with CPT transceiver 12, no housing protrusions or extensions exist to readily indicate that CPT assembly 10 consists of the two unique components, i.e. CPT transceiver 12 and BP/PIU 14. Moreover, in the preferred embodiment BP/PIU 14 is constructed from a material similar to that used for the outer housing of CPT transceiver 12, such as a polycarbonate plastic, to promote continuity of appearance between CPT transceiver 12 and BP/PIU 14, BP/PIU 14 has a shape which is generally defined by a plurality of walls. In addition to front wall 18 and top wall 42, discussed above, BP/PIU 14 includes a back exterior wall 46, which opposes front wall 18, as shown in FIGS. 1 and 4. Moreover, BP/PIU 14 includes a bottom exterior wall 48, which opposes top wall 42. Top and bottom walls 42 and 48 extend between front and back walls 18 and 46, respectively. A battery compartment wall 50 substantially parallels and extends between front and back walls 18 and 46 between top and bottom walls 42 and 48. BP/PIU 14 additionally includes a left exterior wall 52 and a right exterior wall 54. Left wall 52 opposes right wall 54, and each of walls 52 and 54 extends between front wall 18 and back wall 46. Consequently, BP/PIU 14 has a generally rectangular shape.

Walls 18 and 46–54 are configured so that a battery compartment 56 is formed therebetween. In the preferred embodiment of the present invention, battery compartment 56 is sufficiently large to accommodate at least twelve AA size batteries (not shown). The preferred embodiment uses rechargeable batteries, such as conventional nickel-cadmium batteries, and couples such batteries together so that approximately 7.5 volts are supplied thereby.

Those skilled in the art will recognize that battery compartment 56 of the present invention is enlarged when compared to a conventional battery pack utilized in connection with CPT's, such as CPT transceiver 12. This increased size allows the use of more batteries, which in turn permits a longer operation of CPT assembly 10 without recharging. Such longer operation is most advantageous for users of CPT assembly 10 who are renting CPT assembly 10 and may not possess equipment for recharging batteries contained in battery compartment 56.

Battery compartment 56 includes a positive terminal 58a and a negative terminal 58b for coupling the voltage supplied by the batteries contained in compartment 56 to CPT transceiver 12, and to a circuit board 60, which resides within BP/PIU 14 and holds electrical components 61 thereon. Specifically, conductors 62 connect terminals 58a and 58b to power contacts 44a and 44b, respectively. Moreover, a conductor 64 connects positive terminal 58a to circuit board 60.

Connectors 36-38 and circuit board 60 reside in a top compartment 65 of BP/PIU 14. Top compartment 65 is remotely located from battery compartment 56 and surrounded by walls 18, 42, 46, and 50-54. Within top compartment 65, a first portion of the plug pins from connectors 36 and 38 couple to circuit board 60 through conductors 66. In addition, a second portion of the plug pins on connectors 36 and 38 do not couple to circuit board 60 but couple directly to a programmer connector 68 through conductors 70. Programmer connector 68 resides in top compartment 65 and extends through back wall 46 of BP/PIU 14. Specifically, a GROUND signal, a RTN DATA signal, a TX AUDIO/ON-OFF signal, and a MANUAL TEST signal, as defined for CPT transceiver 12, are routed directly from connectors 36 and 38 to connector 68. The terms "RTN DATA" and "TX AUDIO/ON-OFF DATA" are terms of art well known in the cellular telephone industry; that is, the term "RTN DATA" refers to Return Data and the term "TX AUDIO/ON-OFF DATA" refers to data from a handset to a transmit receive unit, and to an on-off level indication monitored by the transmit receive unit. However, a TRU DATA signal and a CMP DATA signal, as defined for CPT transceiver 12, are routed from the communications port of CPT transceiver 12, through connectors 38 and 36, respectively, and through a protection circuit (discussed below) contained on circuit board 60, before being routed to connector 68 through conductors 72 for external coupling to a CPT programmer 74 (see FIG. 5). The terms "TRU DATA" and "CMP DATA" are terms of art well known in the cellular telephone industry; that is, the term "TRU DATA" refers to Transmit Receive Unit Data" and the term "CMP DATA" refers to Communication Post Data.

Figure 5:
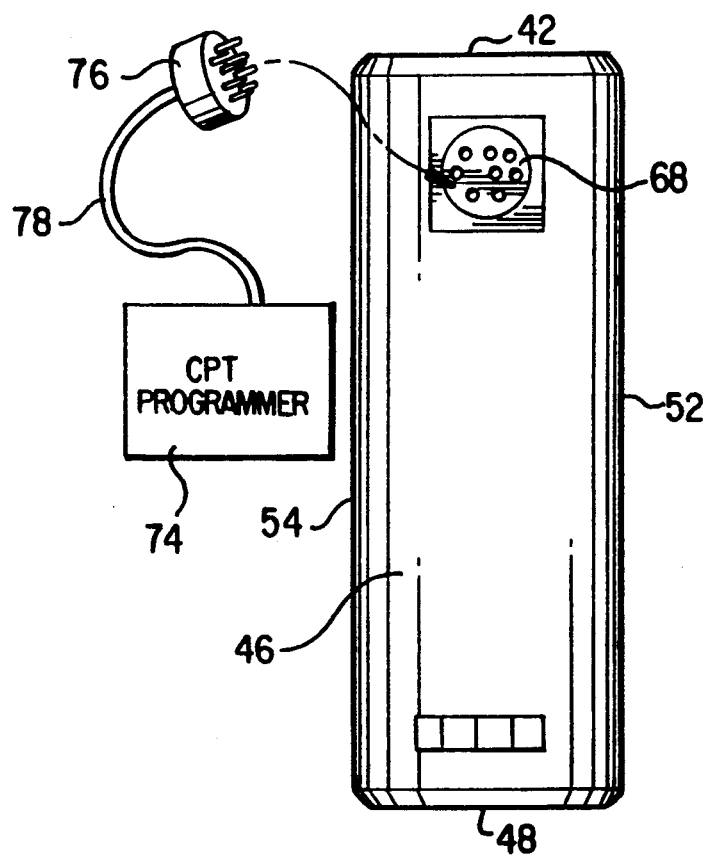
FIG. 5 shows a back plan view of the BP/PIU of the present invention.

As shown in FIG. 5, programmer connector 68 includes only 8 socket pins. Thus, four of the signals contained on the communications port of CPT transceiver 12 are not brought out of BP/PIU 14. The omitting of unneeded signals permits the use of a less expensive connector for connector 68 while promoting reliability. Connector 68 is intended to couple to a CPT programmer 74 through a connector 76 and appropriate cabling 78. CPT programmer 74 includes sufficient intelligence and circuitry to utilize the communications port of CPT transceiver 12 to read various operating parameters of CPT transceiver 12, such as the electronic serial number ("ESN") and transmission call timers therein. Moreover, CPT programmer 74 includes sufficient circuitry to reprogram other CPT parameters, such as the CPT's mobile identification number ("MID") and system identification number ("SID") in accordance with the use of CPT assembly 10 in an automated rental system.

The present invention contemplates the use of a CPT programmer 74 which is either a stand-alone, "countertop" unit or is incorporated in an automated dispensing machine for the automated rental of CPT assembly 10 and a multiplicity of additional like ones of CPT assemblies 10. Of course, those skilled in the art will recognize that such electronic communication between CPT transceiver 12 and CPT programmer 74 occurs without disassembling CPT assembly 10 into its constituent components.

Figure 6:
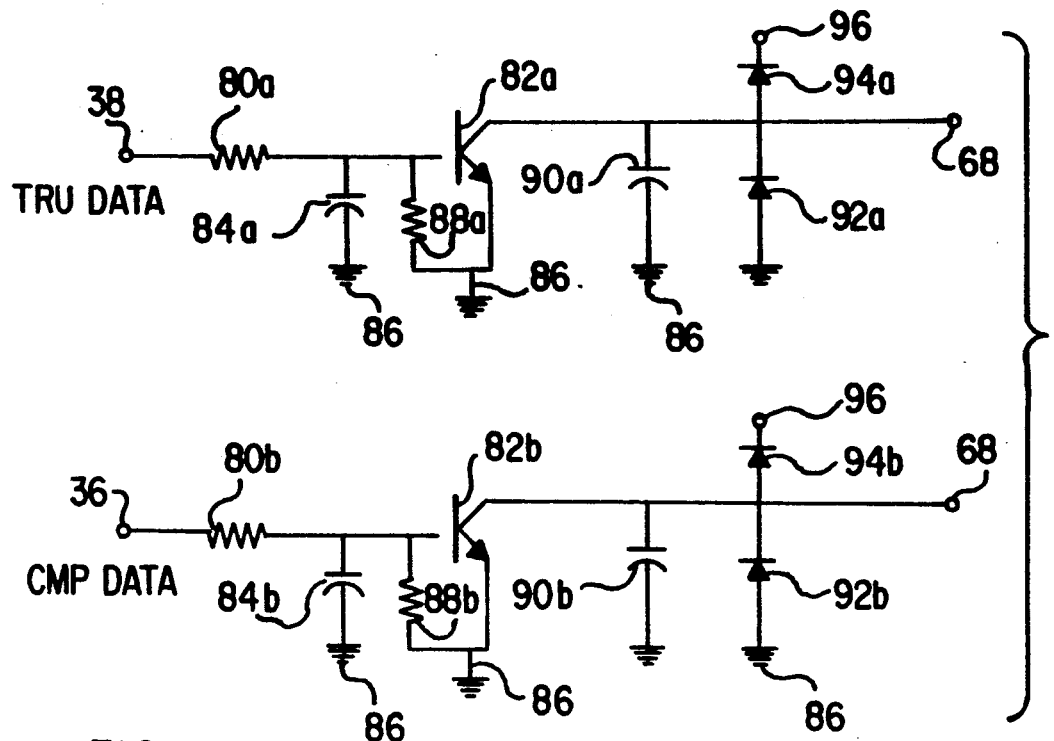
FIG. 6 shows a schematic diagram of interface circuitry included in the BP/PIU of the present invention.

FIG. 6 shows a schematic diagram of the protection circuitry contained on circuit board 60. In the preferred embodiment, circuit board 60 includes two identical circuits. One of these identical circuits, whose constituent components are given an "a" designator appended to the reference numbers shown in FIG. 6, interfaces the TRU DATA signal to CPT programmer 74. The other one, whose constituent components are given a "b" designator appended to the reference numbers shown in FIG. 6, interfaces the CMP DATA signal to CPT programmer 74. Since these two circuits are identical in the preferred embodiment, both are described below using only the reference numbers without the appended "a" and "b" designators which distinguish the two circuits from one another.

The input signal, which is supplied from connectors 36 or 38 (see FIG. 1) couples through a series-connected, 15K, current limiting resistor 80 to a control input of an active device 82, which in the preferred embodiment represents a base input of an NPN transistor.

A 27 pf capacitor 84 couples between the control input of active device 82 and a terminal 86, which is adapted to receive a common, or ground, potential, and which may couple to negative terminal 58b in battery compartment 56 (see FIG. 4). A first node of a 15K resistor 88 couples to the control input of active device 82. A second node of resistor 88 couples to a first output, represented as an emitter in the preferred embodiment, of active device 82, and to ground terminal 86. A second output, represented as a collector in the preferred embodiment, of active device 82 couples to a specific one of the socket pins contained in connector 68 (see FIGS. 4 and 5). In addition, a 27 pf capacitor 90 couples between this output and the ground terminal 86.

Moreover, a protection circuit, which consists of a diode 92 and a diode 94, also couples to the second output of active device 82. Specifically, a cathode of diode 92 and an anode of diode 94 couple to this output. An anode of diode 92 couples to ground terminal 86, and a cathode of diode 94 couples to a terminal 96. Terminal 96 is adapted to receive a positive voltage, which in the preferred embodiment is supplied through conductor 64 from terminal 58a in battery compartment 56 (see FIG. 2).

The circuits shown in FIG. 6 protect the TRU DATA and CMP DATA signals output at the communications port of CPT transceiver 12. Diode 92 prevents the voltages experienced at the output of active device 82 from becoming significantly negative, and diode 94 prevents the voltages experienced at the output of active device 82 from becoming significantly more positive than the voltage supplied by the batteries in battery compartment 56 (see FIG. 4). Of course, those skilled in the art will recognize that a typical 0.7 Vdc drop experienced across diodes 92 and 94 would not be viewed as a significantly negative or positive voltage in the present context because such voltages will not cause damage to active device 82. In addition, capacitors 84 and 90 force signal transitions experienced by the protection circuits of FIG. 6 from being so fast that damage to active device 82 or to circuitry contained within CPT transceiver 12 (see FIG. 1) results. In addition, those skilled in the art will recognize that additional electrical circuitry could be included on circuit board 60 even though not specifically discussed herein. Such electrical circuitry may, for example, relate to the charging of batteries contained in battery compartment 56 (see FIG. 4) and to thermal sensing to control battery charging.

In summary, the CPT assembly 10 described above provides a convenient interface through the use of connector 68 so that CPT assembly 10 may be utilized in an automated rental system. Through connector 68, CPT programmer 74 may uniquely identify CPT assembly 10 and read and modify parameters of CPT transceiver 12 which relate to the rental of CPT assembly 10. Moreover this communication with CPT transceiver 12 occurs without the disassembly of CPT assembly 10. In addition, battery compartment 56 in BP/PIU 14 of the present invention is specifically improved for use in connection with a rental operation.

The present invention has been described above with reference to a preferred embodiment. However, those skilled in the art will recognize that additions, changes, and modifications may be made in this preferred embodiment without departing from the scope of the present invention. For example, those skilled in the art can easily devise a convenient and effective technique for securing BP/PIU 14 to CPT transceiver 12. In addition, the specific quantities of pins, and connector orientations described herein may be modified by those skilled in the art in order to adapt CPT assembly 10 to operate in connection with various automated dispensing machines. These and other additions, changes, and modifications which are obvious to those skilled in the art are intended to be included within the scope of the present invention.

What is claimed is:

1. A cellular portable telephone ("CPT") assembly having component parts capable of being assembled together and to a CPT programmer for providing an automated system which manages registration and registration cancellation of said CPT assembly by means of said CPT programmer, said CPT assembly comprising a programmable CPT transceiver and a battery pack and programmer interface unit ("BP/PIU"), said CPT transceiver and said BP/PIU including interface means by which said CPT transceiver and said BP/PIU are readily mechanically and electrically connectable and disconnectable relative to each other, and by which said BP/PIU and said CPT programmer are readily mechanically and electrically connectable and disconnectable relative to each other, said CPT transceiver being readily electrically connectable and disconnectable relative to said CPT programmer by being readily electrically connectable and disconnectable relative to said BP/PIU which is readily electrically connectable and disconnectable relative to said CPT programmer, said interface means for reading and reprogramming of said CPT transceiver by said CPT programmer through said BP/PIU and for routing a TRU DATA signal and a CMP DATA signal from said CPT transceiver through said BP/PIU to said CPT programmer.

2. The cellular portable telephone assembly of claim 1 wherein said BP/PIU includes unit walls having opposing sides configured to form, between said opposing sides, a compartment for batteries, and wherein said interface means includes a circuit board having an electrical interface circuit residing thereon, said circuit board being located between said opposing sides, out of said compartment, first connector means, extending through said unit walls, for electrically coupling said electrical interface circuit to said CPT transceiver, and second connector means, extending through said unit walls, for electrically coupling said electrical interface circuit to said CPT programmer.

3. The cellular portable telephone assembly of claim 2 wherein said BP/PIU further includes terminal means, located in said compartment, for receiving a positive and a negative voltage; and
means, coupled to said terminal means and said circuit board, for electrically supplying said positive voltage to said circuit board.

4. The cellular portable telephone assembly of claim 3 wherein said interface means comprises an external communications port provided in a first predetermined number of connector pins which are arranged in a predetermined orientation on a back side of said CPT transceiver, said first connector means comprises said first predetermined number of connector pins arranged in said predetermined orientation and protruding outward from said unit walls, and said second connector means comprises a connector having fewer than said first predetermined number of connector pins.

5. The cellular portable telephone assembly of claim 4 wherein a first portion of said first connector means connector pins couples to said second connector means, and a second portion of said first connector means connector pins couples to said circuit board.

6. The cellular portable telephone assembly of claim 5 wherein said electrical interface circuit comprises:
first and second terminals adapted to receive positive and negative battery voltages, respectively;
a first active device having a first control input coupled to said first connector means and an output coupled to said second connector means;
a first protection means, coupled to said first active device output and to said first and second terminals to interface said TRU DATA signal to said CPT programmer, for preventing voltages experienced at said first active device output from becoming significantly greater than and from becoming significantly less than said positive and negative voltages, respectively;
a second active device having a second control input coupled to said first connector means and an output coupled to said second connector means; and
second protection means, coupled to said second active device output and to said first and second terminals to interface said CMP DATA signals to said CPT programmer, for preventing voltages experienced at said second active device output from becoming significantly greater than and from becoming significantly less than said positive and negative voltages, respectively.

7. The cellular portable telephone assembly of claim 6 wherein said electrical interface circuit additionally comprises:
two first capacitors each coupled between a respective one of said first and second active device outputs and one of said first and second terminals;
two second capacitors each coupled between a respective one of said first and second active device outputs and one of said first and second terminals;
two current limiting devices each coupled between a respective one of said first and second active device control inputs and said first connector means.

8. In an automated rental system which manages registration and registration cancellation of a cellular portable telephone ("CPT") assembly along with a multiplicity of like ones of said assembly wherein the improvement comprises, a CPT programmer, a programmable CPT transceiver and a battery pack and programmer interface unit ("BP/PIU"), said CPT transceiver, said BP/PIU and said CPT programmer including interface means by which said CPT transceiver and said BP/PIU are readily mechanically and electrically connectable and disconnectable relative to each other, and by which said BP/PIU and said CPT programmer are readily mechanically and electrically connectable and disconnectable relative to each other, said CPT transceiver being readily electrically connectable and disconnectable relative to said CPT programmer by being readily electrically connectable and disconnectable relative to said BP/PIU which is readily electrically connectable and disconnectable relative to said CPT programmer, said interface means for reading an electronic serial number and transmission call timers of said CPT transceiver, and for reprogramming a mobile identification number and system identification number of said CPT transceiver, by said CPT programmer through said BP/PIU, and for routing a TRU DATA signal and a CMP DATA signal from said CPT transceiver through said BP/PIU to said CPT programmer.

9. The automated rental system of claim 8 wherein said BP/PIU comprises a compartment for housing batteries, said compartment including a positive terminal for coupling to a positive voltage; and further wherein said BP/PIU comprises:

first and second terminals adapted to receive positive and negative battery voltages, respectively, said first terminal being coupled to said positive terminal, a first active device having a first control input adapted to receive a signal generated by a communications port of said CPT transceiver and having an output, a first protection means, coupled to said first active device output and to said first and second terminals to interface said TRU DATA signals to said CPT programmer, for preventing voltages experienced at said first active device output from becoming significantly greater than and from becoming significantly less than said positive and negative voltages, respectively;

a second active device having a second control input adapted to receive a second signal generated by said communications port of said CPT transceiver and having an output; and second protection means, coupled to said second active device output and to said first and second terminals to interface said CMP DATA signals to said CPT programmer, for preventing voltages experienced at said second active device output from becoming significantly greater than and from becoming significantly less than said positive and negative voltages, respectively.

10. The automated rental system of claim 9 wherein said BP/PIU additionally comprises:

two first capacitors each coupled between a respective one of said first and second active device outputs and one of said first and second terminals; and two second capacitors each coupled between a respective one of said first and second active device control inputs and one of said first and second terminals.

11. A cellular portable telephone ("CPT") assembly having component parts capable of being assembled together and to a CPT programmer for providing an automated system which manages registration and registration cancellation of said CPT assembly along with multiplicity of like ones of said CPT programmer, said CPT assembly comprising a programmable CPT transceiver and a battery pack and programmer interface unit ("BP/PIU"), said CPT transceiver and said BP/PIU including interface means by which said CPT transceiver and said BP/PIU are readily mechanically and electrically connectable and disconnectable relative to each other, and by which said BP/PIU and said CPT programmer are readily mechanically and electrically connectable and disconnectable relative to each other, said CPT transceiver being readily electrically connectable and disconnectable relative to said CPT programmer by being readily electrically connectable and disconnectable relative to said BP/PIU which is readily electrically connectable and disconnectable relative to said CPT programmer, said interface means for reading and electronic serial number and transmission call timers of said CPT transceiver, and for reprogramming a mobile identification number and system identification number of said CPT transceiver, by said CPT programmer through said BP/PIU, and for routing a TRU DATA signal and a CMP DATA signal from said CPT transceiver through said BP/PIU to said CPT programmer.

12. The cellular portable telephone assembly of claim 11 wherein said CPT transceiver includes, at a back side thereof, an outwardly protruding antenna connector, an external communications port, and a set of electrical power contacts distally located from said external communications port; and further wherein said ("BP/PIU") is coupled to said CPT transceiver at said back side thereof and comprises unit walls having first and second opposing sides and having third and fourth opposing sides disposed between said first and second sides, said unit walls being configured to form, between said first, second, third, and fourth sides, a compartment for housing batteries, terminal means, located in said compartment, for receiving a positive and a negative voltage, and first connector means, extending through said first side, for electrically coupling said terminal means to said set of electrical power contacts;

a circuit board having an electrical interface circuit residing thereon, said circuit board being located between said first, second, third, and fourth sides, second connector means, extending through said first side, for electrically coupling said electrical interface circuit to said CPT transceiver external communication port, and third connector means, extending through one of said second, third, and fourth sides, for electrically coupling said electrical interface circuit to said CPT programmer.

13. The cellular portable telephone assembly of claim 12 wherein said BP/PIU additionally comprises means, coupled to said terminal means and to said circuit board, for electrically supplying said positive voltage to said circuit board.

14. In an automated rental system which manages registration cancellation of a cellular portable telephone ("CPT") assembly along with a multiplicity of like ones of said CPT assembly wherein the improvement comprises a CPT programmer, a programmable CPT transceiver and a battery pack and programmer interface unit ("BP/PIU"), said CPT transceiver, said BP/PIU and said CPT programmer including interface means by which said CPT transceiver and said BP/PIU are readily mechanically and electrically connectable and disconnectable relative to each other, and by which said BP/PIU and said CPT programmer are readily mechanically and electrically connectable and disconnectable relative to each other, said CPT transceiver being readily electrically connectable and disconnectable relative to said CPT programmer by being readily electrically connectable and disconnectable relative to said BP/PIU which is readily electrically connectable and disconnectable relative to said CPT programmer through said BP/PIU said interface means for reading and reprogramming of said CPT transceiver by said CPT programmer through said BP/PIU and for routing a TRU DATA signal and a CMP DATA signal from said a CPT transceiver through said BP/PIU to said CPT programmer.

15. The automated rental system of claim 14 wherein said interface means comprises an external communications port provided by a first predetermined number of connector pins which are arranged in a predetermined orientation on a back side thereof; further wherein said BP/PIU is coupled to said CPT transceiver at said back side thereof and comprises unit walls having first and second opposing sides and having third and fourth opposing sides disposed between said first and second sides, said unit walls being configured to form, between said first, second, third, and fourth sides, a compartment for housing batteries; further wherein said interface means comprises a circuit board having an electrical interface circuit residing thereon, said circuit board being located between said first, second, third, and fourth sides, first connector means, extending through said first side, for electrically coupling said electrical interface circuit to a first portion of said first predetermined number of connector pins of said CPT transceiver external communications port, and second connector means, extending through one of said second, third, and fourth sides, for electrically coupling said electrical interface circuit to said CPT programmer; and further wherein said BP/PIU comprises means, coupled to said first connector means and to said second connector means, for routing a second portion of said first predetermined number of connector pins of said CPT transceiver external communications port to said CPT programmer.

16. The automated rental system of claim 15 wherein said first connector means comprises said first predetermined number of connector pins arranged in said predetermined orientation and protruding outward from said BP/PIU; and said second connector means comprises a connector having fewer than said first predetermined number of connector pins.

17. The automated rental system of claim 16 wherein said BP/PIU additionally comprises:

terminal means, located in said battery-housing compartment, for receiving a positive and a negative voltage; and means, coupled to said terminal means and said circuit board, for electrically supplying said positive voltage to said circuit board.

18. The automated rental system of claim 17 wherein said interface means comprises:

first and second terminals adapted to receive positive and negative battery voltages, respectively;

a first active device having a first control input coupled through said first connector means to said first portion of said CPT transceiver external communications port connector pins and having an output coupled to said second connector means; and first protection means, coupled to said first active device output and to said first and second terminals to interface said TRU DATA signals to said CPT programmer, for preventing voltages experienced at said first active device output from becoming significantly greater than and from becoming significantly less than said positive and negative voltages, respectively.

19. The automated rental system of claim 18 wherein said interface means additionally comprises:

a second active device having a second control input coupled through said first connector means to said first portion of said CPT transceiver external communications port connector pins and having an output coupled to said second connector means; and second protection means, coupled to said second active device output and to said first and second terminals to interface said CMP DATA signals to said CPT programming, for preventing voltages experienced at said second active device output from becoming significantly greater than and from becoming significantly less than said positive and negative voltages, respectively.

20. The automated rental system of claim 19 wherein said interface means additionally comprises:

two first capacitors each coupled between a respective one of said first and second active device outputs and one of said first and second terminals;

two second capacitors each coupled between a respective one of said first and second active device control inputs and one of said first and second terminals; and two current limiting devices each coupled between a respective one of said first and second active device control inputs and said first connector means.

* * * * *